US007406471B1

(12) United States Patent
Shankar et al.

(10) Patent No.: US 7,406,471 B1
(45) Date of Patent: Jul. 29, 2008

(54) SCALABLE MULTI-DATABASE EVENT PROCESSING SYSTEM USING UNIVERSAL SUBSCRIBER-SPECIFIC DATA AND UNIVERSAL GLOBAL DATA

(75) Inventors: Ravi Shankar, Cupertino, CA (US); Keith M. Brefczynski, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 699 days.

(21) Appl. No.: 09/967,493

(22) Filed: Sep. 27, 2001

Related U.S. Application Data

(60) Provisional application No. 60/238,341, filed on Oct. 5, 2000, provisional application No. 60/236,400, filed on Sep. 28, 2000.

(51) Int. Cl.
*G06F 17/30* (2006.01)
*G06F 7/00* (2006.01)
(52) U.S. Cl. .................. 707/10; 707/4; 707/104.1
(58) Field of Classification Search ............... 713/200; 707/10, 5, 2, 4, 104.1
See application file for complete search history.

(56) References Cited

U.S. PATENT DOCUMENTS

| | | | | |
|---|---|---|---|---|
| 5,469,497 A | | 11/1995 | Pierce et al. ................ 379/115 |
| 5,499,371 A | | 3/1996 | Henninger et al. .......... 395/700 |
| 5,677,945 A | | 10/1997 | Mullins et al. ............... 379/91 |
| 5,745,754 A | | 4/1998 | Lagarde et al. .............. 395/615 |
| 5,850,544 A | * | 12/1998 | Parvathaneny et al. ...... 707/101 |
| 5,974,441 A | | 10/1999 | Rogers et al. ............... 709/200 |
| 6,236,972 B1 | * | 5/2001 | Shkedy ........................ 705/1 |
| 6,311,185 B1 | * | 10/2001 | Markowitz et al. .......... 707/10 |
| 6,311,186 B1 | * | 10/2001 | MeLampy et al. .......... 707/10 |
| 6,314,365 B1 | | 11/2001 | Smith ....................... 701/200 |
| 6,341,272 B1 | * | 1/2002 | Randle ....................... 705/40 |
| 6,477,651 B1 | * | 11/2002 | Teal ............................ 726/23 |
| 6,481,752 B1 | | 11/2002 | DeJoseph .................... 281/5 |
| 6,494,367 B1 | | 12/2002 | Zacharias .................. 235/382 |
| 6,564,247 B1 | * | 5/2003 | Todorov .................... 709/206 |
| 6,658,415 B1 | * | 12/2003 | Brown et al. ............... 707/10 |
| 2002/0059163 A1 | * | 5/2002 | Smith ........................ 707/1 |
| 2003/0014656 A1 | * | 1/2003 | Ault et al. .................. 713/200 |

OTHER PUBLICATIONS

Oracle7™ Server Distribution Systems, vol. II: Replicated Data, Release 7.3, Feb. 1996.*
Oracle® Applications, Concepts, Release 11 for UNIX, Apr. 1998.*
Oracle7™ Server Distribution Systems, vol. II: Replicated Data, Release 7.3, Feb. 1996. (provided previously).*

(Continued)

*Primary Examiner*—Kuen S Lu
(74) *Attorney, Agent, or Firm*—Townsend and Townsend and Crew LLP

(57) ABSTRACT

Methods and architectures for implementing a scalable multi-database event processing system are provided. In one embodiment, selected account data is aggregated for all subscribers (aggregated subscriber-specific data) and a copy included on each database. In one embodiment, selected data that is not subscriber specific and that may apply to many accounts ("global data") is also maintained and copied to each database. The global data preferably includes business data that is frequently required during operation of the system, such as pricing data. A transaction that requires business data and access to an account is processed using the copy of the business data that is on the database on which the account is located. In an embodiment, the aggregated subscriber-specific data is used in performing searches.

10 Claims, 9 Drawing Sheets

OTHER PUBLICATIONS

QDB—A query processor for high performance parallel data server NDB Cluster, Martin SkÖld, LinkÖping University, Sweden, Apr. 1999.*

Oracle® Applications, Concepts, Release 11 for UNIX, Apr. 1998. (provided previously).*

* cited by examiner

1102

| Item # | Unit Price | Transaction Discount (Per Dozen) |
|---|---|---|
| 54126 | $10.50 | $110 |
| 22157 | $5.79 | $50 |
| 12338 | $52.00 | - |
| 21799 | $8.50 | $64 |

| Minutes (One Call) | Price Per Minute (Cents) | Tier Cost (Dollars) |
|---|---|---|
| 1-10 | 20 | 2 |
| 11-50 | 15 | 8 |
| 51-100 | 10 | 13 |
| 101+ | 5 | 13+0.05* (Minutes Over 100) |

FIG. 11B

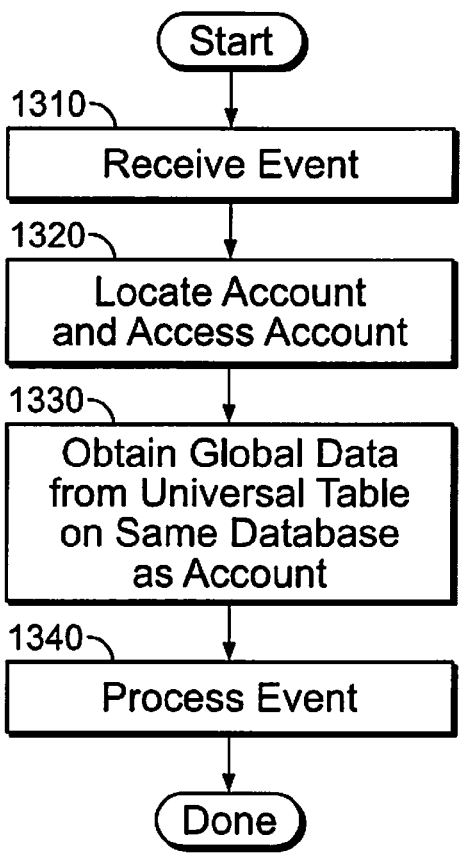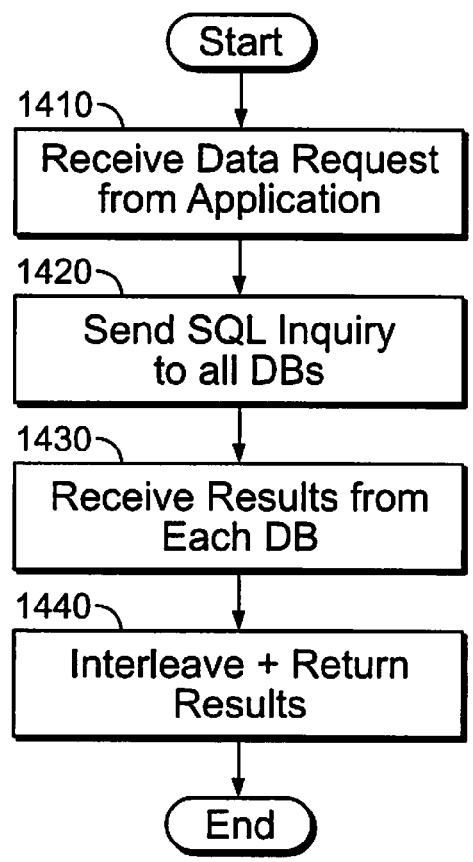
FIG. 13
FIG. 14

SCALABLE MULTI-DATABASE EVENT PROCESSING SYSTEM USING UNIVERSAL SUBSCRIBER-SPECIFIC DATA AND UNIVERSAL GLOBAL DATA

CROSS REFERENCE TO RELATED APPLICATIONS

The present invention claims priority under 35 U.S.C. 119 of U.S. Provisional Patent Application No. 60/236,400, filed Sep. 28, 2000, and U.S. Provisional Patent Application No. 60/238,341, filed Oct. 5, 2000, which are each incorporated herein by reference in their entireties.

BACKGROUND OF THE INVENTION

The present invention relates to event processing systems and systems that are suitable for electronic business. More specifically, the invention relates to event processing systems which use multiple databases.

With the increasing growth of on-line business and globalization of business, very large accounting systems have become necessary. Such large accounting systems typically require multiple databases, or very complicated programming. In general, the accounting systems must be high performance and able to process an event, as well as access data, very quickly.

It is known to maintain several separate distributed databases having customer-specific data. An additional database having non-customer-specific data may also be maintained. Processing a transaction often requires data that is located in more than one database. For example, a system may need pricing data stored on one database, as well as account information stored on a separate distributed database on which the account resides. When two databases are accessed, a "two-phase commit" procedure is used in order to maintain consistency of the data, as will be appreciated by those skilled in the art. A two=phase commit procedure synchronizes the data and locks both databases for the duration of the transaction. The two-phase commit slows down the transaction, and also makes the databases involved unavailable for other uses. The data synchronization process involves a high overhead that applies to many transactions. Such systems are generally not capable of delivering the fast performance that is increasingly being demanded in large event processing systems.

An additional problem with conventional distributed databases is that operations requiring data from multiple databases are often cumbersome to program. For example, to run billing on all accounts typically requires that a programmer create a billing computer program that is tailored to query each database.

In addition, accounts are typically assigned to a particular database based on an account characteristic, such as billing address. This makes it relatively easy to find the correct database if the characteristic, e.g., billing address, is known. However, finding an account based on a different characteristic, such as a login name, may require a full search. Another disadvantage is that, once chosen, the criteria on which accounts are assigned to a database are inflexible, in order to allow searching based on the criteria to be relatively easy, among other reasons. This creates a potential single point of failure for creation of new accounts and other administrative functions. For example, when each database is assigned to a geographic region, if a database is down, no users from that region may be added to the database.

Accordingly, implementing a multi-database system that is scalable to very large systems; i.e., that has low overhead per transaction and does not use the two-phase commit, would be desirable. It would further be desirable if the system provided data location transparency, and if some flexibility were available in the assignment of customers to a database so that a database is substantially always available for adding new users.

SUMMARY OF THE INVENTION

The invention provides methods and architectures for implementing a scalable multi-database event processing system. In one embodiment, selected account data is aggregated for all subscribers (aggregated subscriber-specific data or "ASD"), and a copy is included on each database. In one embodiment, selected data that is not subscriber specific and that may apply to many accounts, i.e., "global data," is also maintained and copied to each database. The global data preferably includes business data that is frequently required during operation of the system, such as pricing data. A transaction that requires business data and access to an account is processed using the copy of the business data that is on the database on which the account is located. In one embodiment, the ASD is used in performing searches.

Because global data is universally available locally on each database, only one database is involved in processing a transaction that requires access to an account as well as access to business data. Overhead associated with coordinating and synchronizing two databases, e.g., a two-phase commit, is effectively eliminated. Use of aggregated, selected subscriber data provides fast searches of subscriber data in a multi-database system.

In one embodiment, a method for processing an event is provided. An event that requires accessing an account that is stored on one of multiple databases of a multi-database event processing system is received. A data structure on a first database is accessed to determine the one of multiple databases that stores the account. This data structure includes information about accounts located on a database other than the first database. The account is accessed and the event is processed.

According to one aspect of the present invention, a method of processing an event in a multi-database event processing system is provided. An event is received for processing that requires access to account information on a first database and global information on a second database. The account information on the first database is accessed. Then, the global information on the first database is accessed, as the first database has stored on it a copy of the global information from the second database. The event is processed utilizing the account and global information.

In one embodiment, a multi-database even processing system storing account information is provided that includes a first database that includes a master copy of subscriber-specific data, and a second database that includes a copy of the master copy of the subscriber-specific data.

In another embodiment, a method of searching in a multi-database system is provided. A subscriber-specific data table at a database is searched. If the search is not successful, a master copy of the subscriber-specific table is searched if the subscriber-specific data table was not a master copy. A global search may be performed if searching the master copy is unsuccessful, or if the master copy is unavailable.

In accordance with another aspect of the present invention, a computer program product for processing an event is provided. The product includes computer code that receives an event which, when processed, generally involves accessing an account that is stored on one of multiple database of a multi-database event processing system. The product also includes computer code that accesses a data structure on a first database to determine the database on which the account is stored. The database structure includes information about accounts located on a database other than the first database. Finally, the product includes computer code that access the account on the database on which the account is stored, and computer code that processes the event, as well as a computer readable medium that stores the computer codes.

According to yet another aspect of the present invention, a method of maintaining a master aggregated subscriber specific data (ASD) table while operating an event processing multi-database system is provided. An action that results in a change of data affecting a master ASD table is performed. Once the action is performed, it is checked whether the action was completed successfully, and the master ASD table is updated to reflect the action.

In another embodiment, a method for establishing service uniqueness in account creation in a multi-database system is provided. A master uniqueness table for a requested login is provided. If the requested login is not found in the master uniqueness table, creation of the login is allowed. In another embodiment, prior to checking the master uniqueness table, a uniqueness table on a secondary database is checked for the login and if the requested login is found the login is denied.

Other features and advantages of the invention will become readily apparent upon review of the following description in association with the accompanying drawings, where the same or similar structures are designated with the same reference numerals.

BRIEF DESCRIPTION OF THE DRAWINGS

FIGS. 11a-b are example pricing tables and examples of global data or business data.

FIG. 13 is a process flow diagram of processing an event requiring account access and global data.

FIG. 14 is a process flow diagram of processing a data request received from an application.

DETAILED DESCRIPTION OF THE EMBODIMENTS

Embodiments of the invention are described below with reference to specific processing systems and methods. However, embodiments of the invention can be implemented in various ways. For example, aspects of the invention can be implemented in software or hardware or using special purpose processors or by any other known mechanism. Therefore, the description of the embodiments that follows is for purposes of illustration and not limitation.

Embodiments of the invention may be used in conjunction with inventions described in the following patents and pending application:

U.S. Pat. No. 6,047,284, titled "Systems and methods for object oriented storage and retrieval of data from a relational database", inventor Gary L. Owens et al., issued Apr. 4, 2000;

U.S. Pat. No. 6,047,267, titled "Method and Apparatus for tracking multiple payment resources and charging transactions to payment resources in on-line transaction processing system", inventor Gary L. Owens et al., issued Apr. 4, 2000; and U.S. patent application Ser. No. 09/617,590, titled "Rating Billing Accounts in Real-time According to Account Usage Information", inventors Sha Ye and David S. Labuda, filed on Jul. 18, 2000.

The aforementioned patents and pending application are all hereby incorporated by reference.

Figure 1:
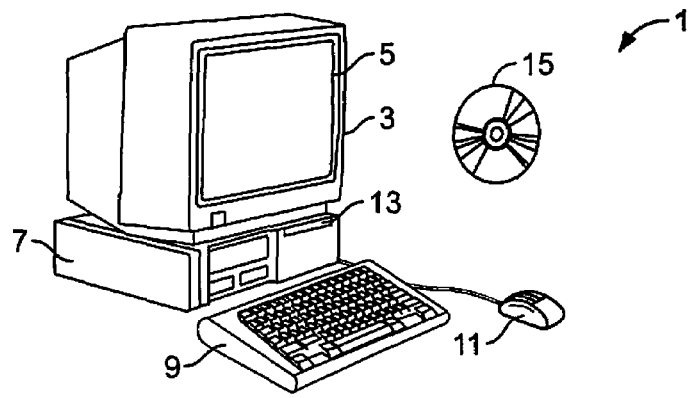
FIG. 1 illustrates an example of a computer system that can be utilized to execute the software of an embodiment of the invention.

FIG. 1 illustrates an example of a computer system that can be used to execute software implementing a portion of a method of an embodiment of the invention, and can act as a client, server, connection manager, or data manager. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

Figure 2:
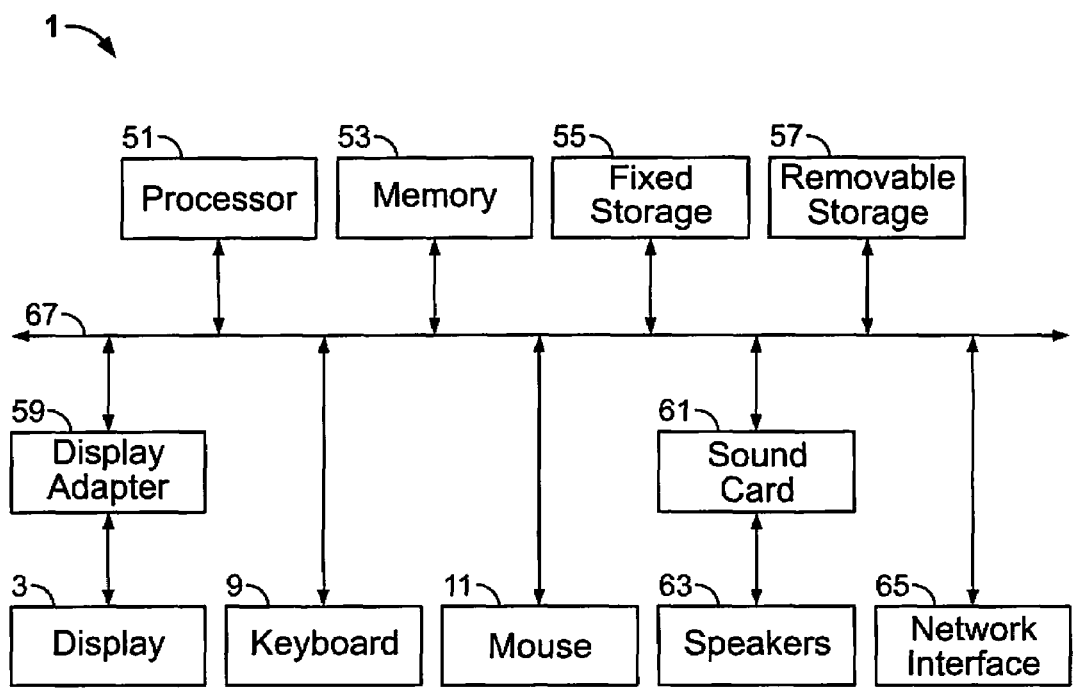
FIG. 2 illustrates a system block diagram of the computer system of FIG. 1.

FIG. 2 shows a system block diagram of computer system 1 that can be used to execute software implementing a portion of a method of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention may include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
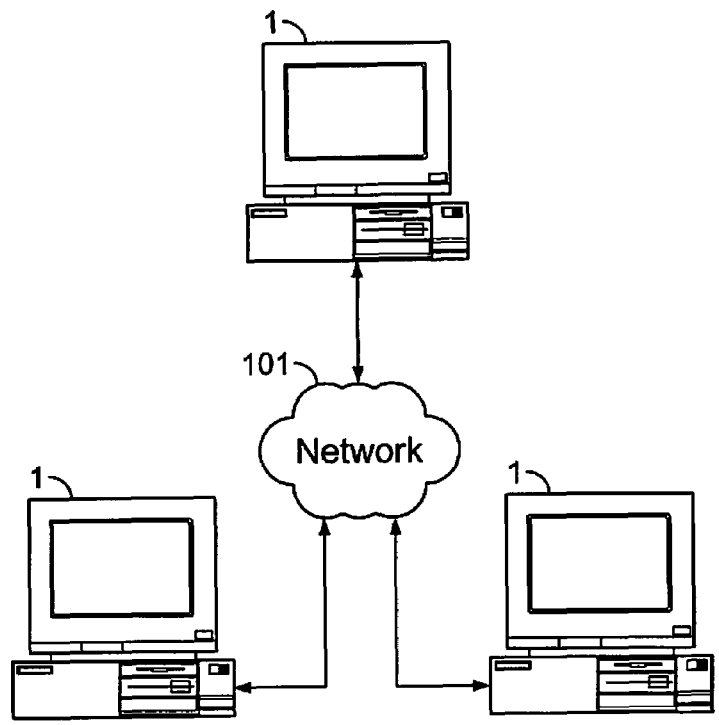
FIG. 3 illustrates a network of multiple computer systems such as the Internet.

FIG. 3 shows a schematic drawing of a network of multiple computer systems. A network 101 provides communication between multiple computer systems 1. In an embodiment of the invention, such multiple computer systems 1 can act as a computer executing a client application, connection manager, or data manager.

Figure 4:
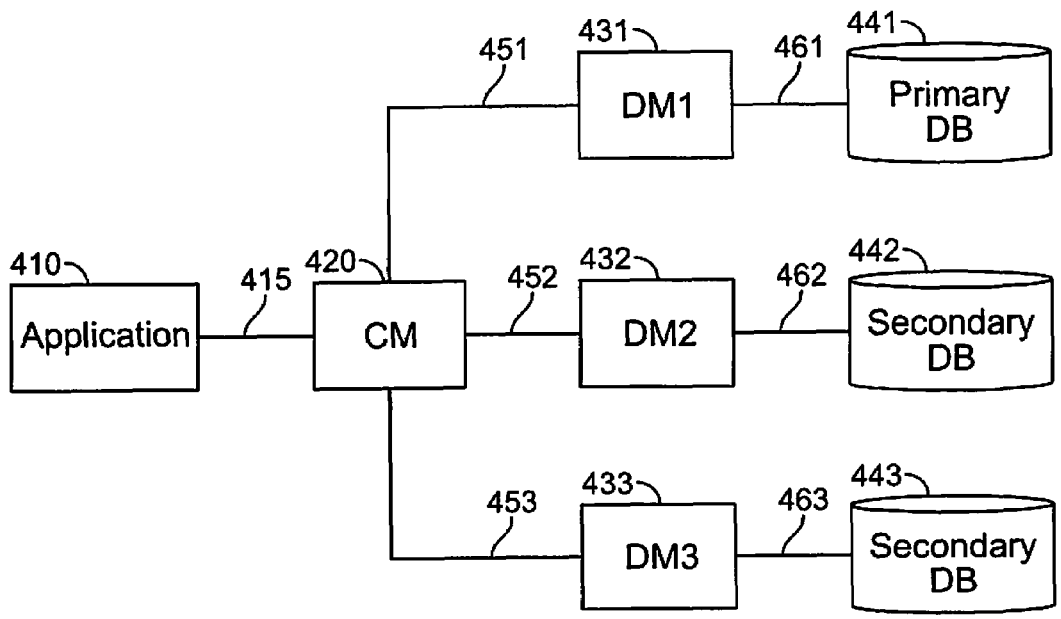
FIG. 4 illustrates an example of an embodiment of an event processing system of the invention.

FIG. 4 illustrates a schematic diagram of an event/transaction processing system on which embodiments of the invention may be implemented. The system includes a client application 410. The application may be executing on, for example, a computer, handheld computing device, cell phone with networking capability, or a set top box. Application 410 may be management software such as a billing program or a marketing data gathering program. In a preferred embodiment, management software is object-oriented. Application 410 may also represent an event generation program that typically is coupled to multiple subscribers at multiple clients. The subscribers may be engaged in activities such as viewing content, phoning, gaming, accessing a service such as connectivity to the Internet, or shopping on-line. Events may include for example, logging in, logging out, selecting content, or purchasing a product. Application 410 may generally be any software that accesses data in the system or adds data to the system.

The machine on which the client application 410 is executing is coupled to a connection manager 420 through a communication link 415 such as, for instance, a modem and a network such as the Internet, phone lines, or wireless communications. Communication link 415 is shown as a connection in FIG. 4. Connection manager 410 preferably is a server, and includes business logic that applies to events.

Connection manager 420 is coupled to multiple data managers 431-433 through respective communication links 451-453 which are network links in a preferred embodiment, although connection manager 420 may be connected substantially directly to multiple data managers 431-433. Each of data managers 431-433 preferably is a server including an object server (not shown). The object server translates object-oriented requests into relational database requests (e.g., SQL). The object server also serves data from the relational database as objects.

Data managers 431-433 are coupled to respective databases 441-443 through communication links 461-463 which, in a preferred embodiment, are direct connections, although any suitable coupling may generally be used. Each of databases 441-443 preferably is a relational database management system (RDBMS or "database"). An RDBMS stores data in relational tables with columns in the tables representing data of the same type. Although each RDBMS typically operates on a different computer system than its respective object server, the RDBMS may also operate on the same computer system. In traditional client-server nomenclature, databases 441-443 are servers. In a preferred embodiment, the RDBMS is an RDBMS available from Oracle Corporation, Redwood Shores, Calif.

In a preferred embodiment, there are logical replication links from primary database 441 to secondary databases 442, 443 (not shown). Data from primary database 441 may be replicated to secondary databases 442, 443. In alternative embodiments, replication may occur from databases other than the primary database to the primary database or to secondary databases.

For illustrative purposes, FIG. 4 shows one client application 410, one connection manager 420, three data managers 431-433, and three databases 441-443. It should be appreciated that the system illustrated in FIG. 4 is but one example of a system on which embodiments of the invention can be implemented. Embodiments of the invention may be applied generally to multi-database systems. In a preferred embodiment, the invention includes multiple clients, connection managers, and an arbitrary number of data managers with respective databases. Alternate embodiments may include multiple mirrored databases. The invention may also be practiced in a system where a database other than a relational database is used.

Figure 5:
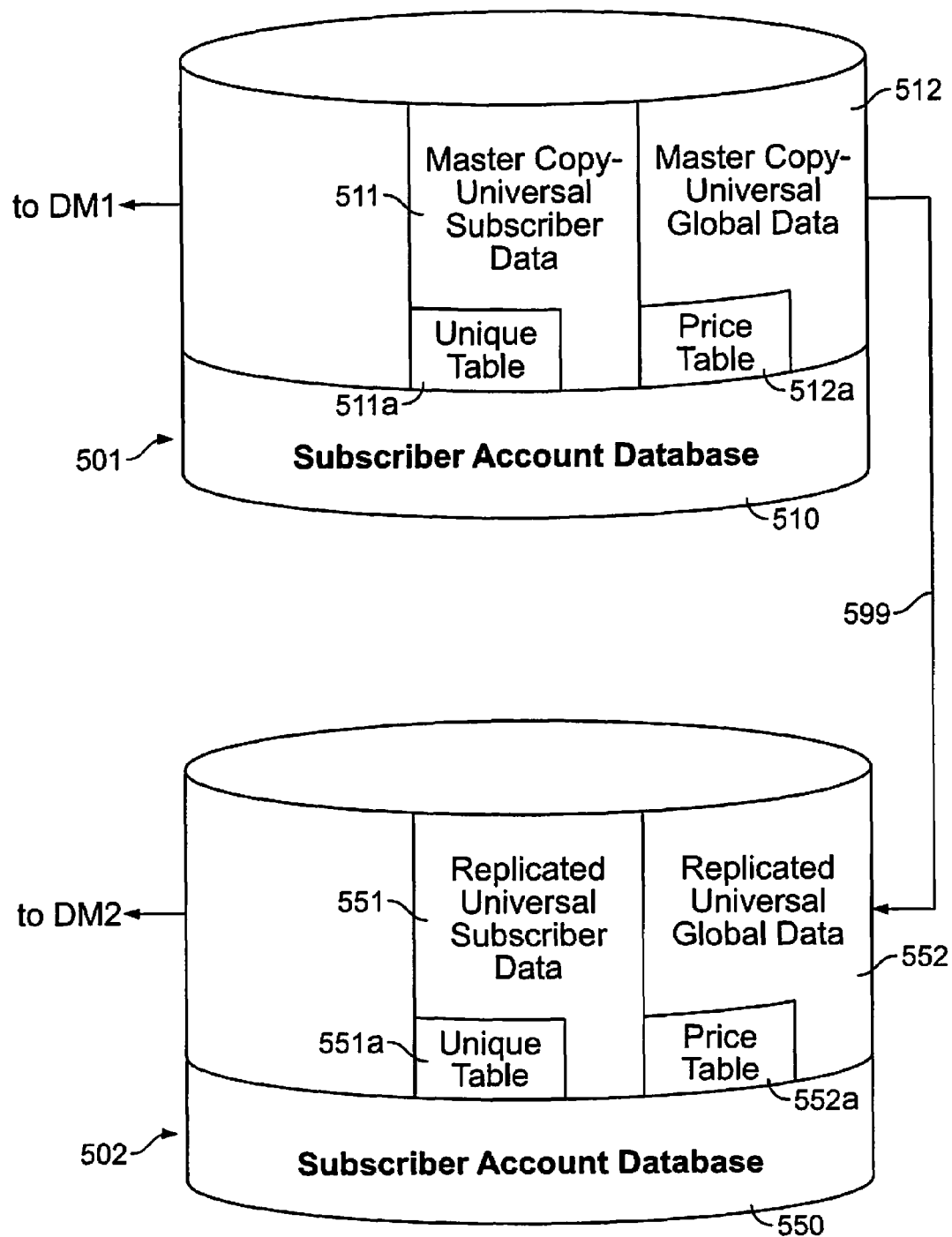
FIG. 5 is a schematic diagram of a primary database and a secondary database.

RDBMS ("database") 441 is shown in FIG. 4 as the "primary database" for ease of reference. A more detailed schematic of a primary database such as database 441 is shown in FIG. 5. Primary database 501 includes subscriber account database 510. Subscriber account database 510 includes information for a first subset of accounts. An account in subscriber account database 510 includes substantially all data pertaining to the account, i.e., the account is not at least partially maintained in two separate locations. The information may include, but is not limited to, service data, basic account information, account balance, and transaction history. Service data typically includes such data as a login name ("login"), an account password, and a type of service. Basic account information may include an account number, the name of an account holder, and a billing address. Transaction history often includes a record of all transactions placed on the account.

RDBMS's ("databases") 442-443 of FIG. 4 are shown as "secondary databases" for ease of reference. A more detailed schematic of a secondary database shown in FIG. 5. A secondary database 502 shown in FIG. 5 includes subscriber account database 550, which includes the same type of information as in subscriber account database 510, but for a second subset of accounts. The accounts in subscriber account database 510 and in subscriber account database 550 are generally different accounts. Subscriber account database 510 is typically not replicated to secondary database 502. Similarly, another secondary database will have a different subset of accounts on its subscriber account database than secondary database 502. An embodiment of the invention may generally include any number of secondary databases.

Primary database 501 includes a master copy of the universal subscriber data 511. Universal subscriber data 511 is aggregated data for substantially all subscribers in all databases. A copy of universal subscriber data 511 is maintained on each database. Typically, universal subscriber data 511 is composed of one or more universal ASD tables. One example of a universal ASD table is a uniqueness table 511*a*. Secondary database 502 includes a copy 551 of universal subscriber data 511, including a copy 551*a* of uniqueness table 511*a*, that preferable is transactionally replicated from the data on the primary database, as is well known in the art.

"Universal" indicates that data is copied to, and available locally on, each database. In a preferred embodiment, the global data as well as the aggregated subscriber-specific data, or universal subscriber data, are universal data.

The primary database includes a master copy of universal global data 512. Global data 512 is selected data that is not specific to a subscriber and that may apply to more than one subscriber. Global data 512 may include, but is not limited to, business data such as price information or the unit of currency the billing is in. What data is included in global data 512 and how the data is arranged is typically configurable. In particular, global data 512 may be segregated with respect to replication; for example, data that changes more frequently may be replicated more frequently. Preferably, global data 512 is "semi-static" data, i.e., data that does not change frequently and is used frequently, which may include price information.

Global 512 data is preferably composed of one or more tables, e.g., global data tables or universal global data tables. Universal global data 512 may include a price table 512*a*. Secondary database 502 includes a copy of global data 552, including price table 552*a*, that preferably is replicated from the master copy, as is well known in the art.

In alternative embodiments, some secondary databases may include a price table that is different from pricing table 552*a*. This may be the case when it is desired to have marketing trials of pricing schemes. In such a case, primary database 501 may have two price tables, e.g., price table A and price table B, each of which is replicated to different databases in the multi-database system. If such is the case, price table A is generally only universal with respect to a subset of databases.

The universal subscriber data and the global data on a database each preferably are stored as one or more tables in the database. Alternatively, the data may be implemented using other data structures such as arrays, linked lists, or any other known data structure.

A "master copy" is generally a writable copy of the data that is updatable, and is generally is replicated to other databases. In a preferred embodiment, there is one master copy of the universal subscriber data and one master copy of the global data that resides on the same database, namely the "primary database"; the other databases are termed "secondary databases". The universal subscriber data may be divided into multiple tables, each of which may be separately replicated. The global data may be divided into multiple tables, each of which may be separately replicated. The information in a master table is typically transferred to secondary databases at configurable intervals. In a preferred embodiment, the transfer is done using transactional replication processes which are well known in the art. Typically, transactional replication locks the master table and the table that is receiving the replication, but is relatively fast as only updates are sent.

As shown in FIG. 5, replication occurs using replication link 599. Replication link 599 encompasses replication of global data 512 as well as replication of subscriber data 511. In a preferred embodiment, there is replication from the master copy of universal global data 512 to each copy of global data 552 on each secondary database 502. In alternate embodiments, there may be multiple replication links between the various databases.

In one embodiment, the master copy of the global data can be on a different database than the master copy of the universal subscriber-specific data. In another embodiment, master copies of the various tables making up the global data or subscriber-specific data or both may be located on various databases. In still another embodiment, more than one database may have a master copy of data, with updates of the master copies either being coordinated or separate. It is also possible for one or more of the secondary databases to receive updates of the global data and the universal subscriber-specific data from the primary database on a near-real-time or real-time basis, thereby providing a continuously up-to-date backup copy. A table may also be replicated to a database on demand.

Uniqueness table 511*a* is an example of data that may be included in universal subscriber data 511. Preferably, uniqueness table 511*a* is stored as table in the relational database, e.g., primary database 501. In one embodiment, information about whether and when uniqueness table 511*a* is accessed is maintained.

Figures 6, 7:
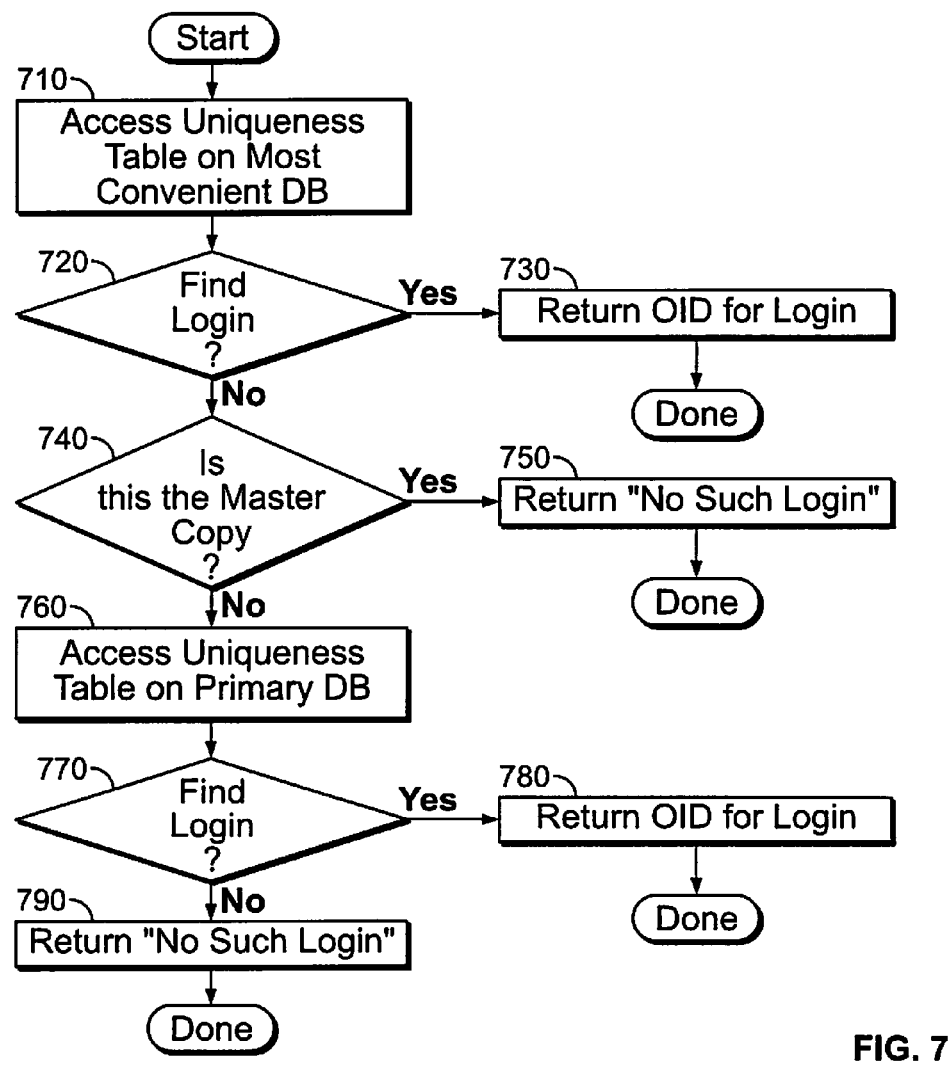
FIG. 6 is an example uniqueness table that is an example universal subscriber-specific data table.
FIG. 7 is a process flow diagram of locating an account by login using a uniqueness table.

FIG. 6 shows a sample uniqueness table. As will be appreciated by those skilled in the art, a uniqueness table may be used to locate an account by login name, substantially without the need to search all databases. Sample table 602 includes a login name for all accounts in the system (across all databases). In general, the login names are each unique. Sample table 602 also includes location information, shown in FIG. 6, such as the service object identification (OID) and the account OID. The first two digits of the service OID and the account OID may be arranged to indicate the database the information is on, and the remainder of the OID pinpoints the location of the information, as known in the art. In a preferred embodiment, each entry in the table also includes the account number and status of the entry in the uniqueness table (confirmed or unconfirmed, as will be discussed below in the discussion of FIG. 8).

FIG. 7 is a process flow diagram which illustrates the steps associated with locating an account by login (typically the login name) using a uniqueness table. Either a master or replicated copy of the uniqueness table which resides on each database may be used. Locating an account occurs, for example, if connection manager 420 of FIG. 4 receives a login event or billing event. At step 710, the uniqueness table on any of the databases is accessed. In a preferred embodiment, a database on which there is already an open connection is used. However, it should be understood that any suitable database may generally be used. At decision step 720, it is determined whether the uniqueness table includes the login. Searching the table for the login (login name) is preferably performed using known database methods. If the login name is found, then the service OID is read from the uniqueness table and the read value is returned at step 730, after which the process terminates. The account OID may also be returned if desired.

If the login name is not found, then it is determined whether the uniqueness table accessed is the master copy of the uniqueness table at step 740. This may be done, for example, by using the connection manager to determine which database it has accessed. If it is the master copy, then it is generally assumed to be up-to-date, and a "no such login" message is returned at step 750, after which the process terminates.

If the result of decision step 740 is negative, i.e., the accessed uniqueness table was not the master copy), then process flow proceeds to step 760 in which the master copy of the uniqueness table is accessed on the primary database. If it is determined, at decision step 770, that the master copy of the uniqueness table contains the desired login, the service OID is read from the uniqueness table and the value is returned at step 780, after which the process terminates. Alternatively, if the result of decision step 770 is negative, then a "no such login" message is returned at step 790, and the process terminates.

It is highly desirable that each login name, or each login name in combination with password and service type, is unique in a system. Another use of the uniqueness table is to enforce uniqueness of login without searching every database.

Figure 8:
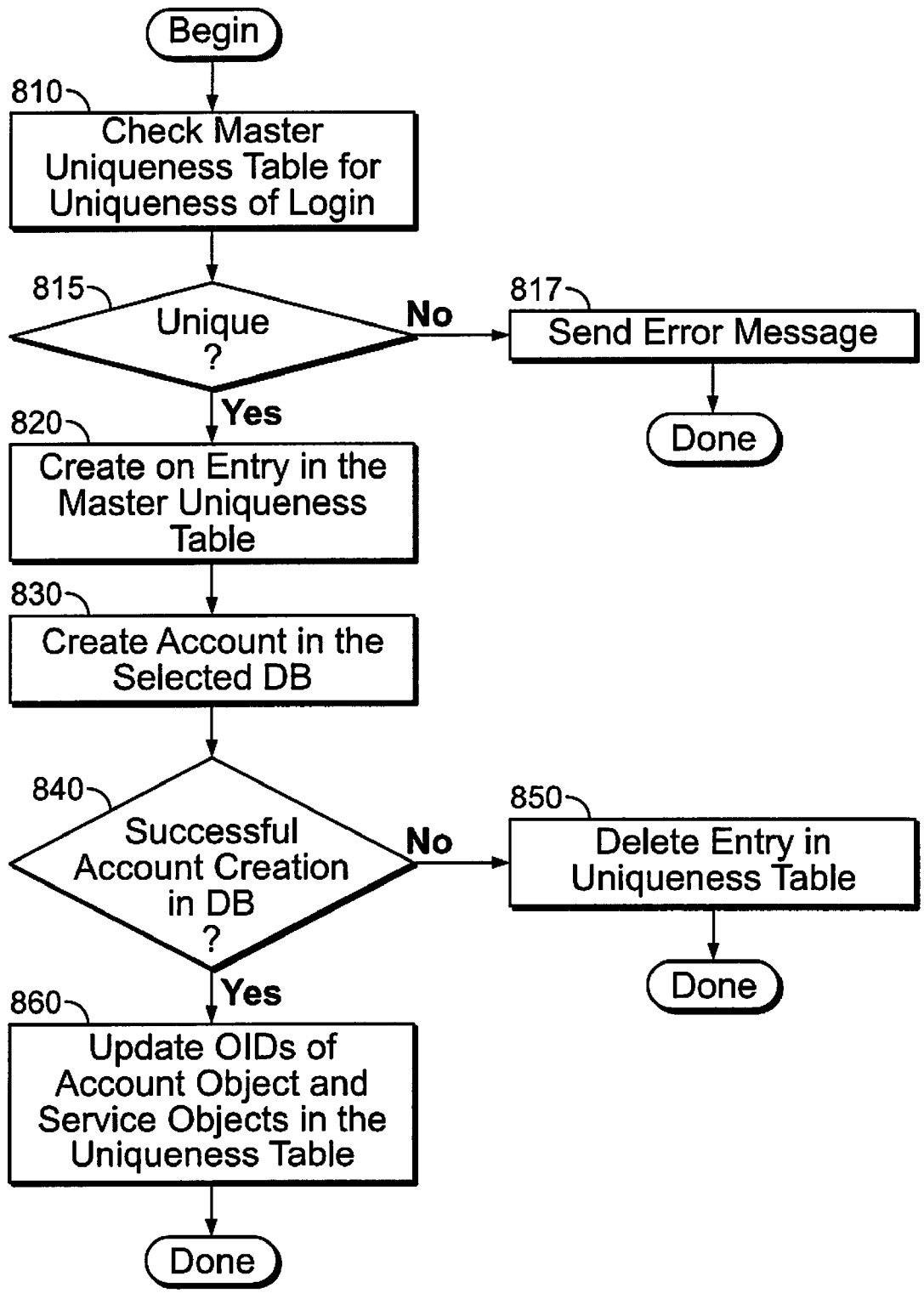
FIG. 8 is a process flow diagram of establishing service uniqueness.

A process flow diagram for enforcing uniqueness is shown in FIG. 8. Enforcing uniqueness may occur, for example, when a new user requests a login name. At step 810 the master copy of the uniqueness table is checked for the uniqueness of the requested login name. If the login name is found to already be in the uniqueness table at step 815, then this login name already exists in the system, and an error message is sent at step 817. It is important to note that in an alternate embodiment, prior to step 810, a copy of the uniqueness table on a convenient database may be checked for the login and the requested login name may be denied if it is found to exist already (not shown in FIG. 8).

If the login name is not found in the uniqueness table at step 815, then the process proceeds to step 820. At step 820, an entry is created in the master copy of the uniqueness table with the login name and selected database information with status set to an unconfirmed value. The database may be selected using any suitable known methods including, but not limited to, for example, having a priority list that ranks the databases with least used database having highest priority, imposing certain criteria on databases such as assigning certain kinds of accounts to certain databases, using priority and criteria in combination, or randomly.

At step 830, account creation in the selected database is attempted, which may include creation of an account object and service object(s). At decision step 840, it is decided whether the account creation was successful. If the account creation was successful, then the process proceeds to step 860 where the OIDs of the account object and service object(s) are updated in the uniqueness table and the status is changed to confirmed. Alternatively, if the account creation was not successful, the entry is deleted from the master copy of the uniqueness table at step 850.

In one embodiment, the actions taken in steps 840-860 are performed asynchronously by a sweeper application. The sweeper application periodically scans the uniqueness table. For those entries with the status set to a value of "unconfirmed," the sweeper application performs steps 840-860, i.e., checks for successful account creation and either updates the uniqueness table entry if the account was successfully created or else deletes the entry. In other embodiments, steps 840-860 may be performed after step 830 during account creation, while step 860 is being performed asynchronously by a sweeper application.

The uses of the uniqueness table to locate an account by login and to enforce uniqueness are but two example uses of the uniqueness table. The uniqueness table shown in FIG. 6 may also be used to find an account using an account number. Uniqueness table 511a is an example of data that may be included in universal subscriber data 511. Universal subscriber data 511 may include any combination of the subscriber-specific data that is useful to the implementer of the system. However, universal subscriber data 511 preferably is relatively small compared to the subscriber account databases that include all information pertaining to an account. Universal subscriber data 511 may be kept in an arbitrary number of tables.

For example, it may be useful to have a table that includes the zip code of the billing address for all subscribers, e.g., an entry may have fields for zip code, service OID, customer OID, and customer name, with neither zip code nor customer name necessarily being unique. As another example, it may be useful to have a table that includes the customer OID of substantially all charter subscribers to a service, thereby enabling the accounts of all charter subscribers to be easily accessed. As a further example, it may be useful to have a table that indicates what rate plan each account subscribes to in a cable television service.

Figure 9:
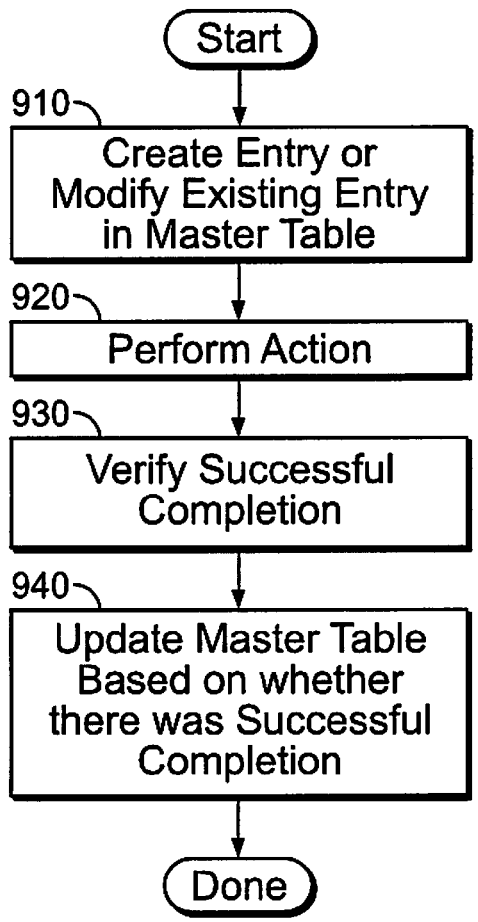
FIG. 9 is a process flow diagram of performing an action that changes data in a universal subscriber-specific data table.

A flow chart for performing an action that affect a subscriber-specific data table, such as the uniqueness table, is shown in FIG. 9. At step 910, an entry is created or an existing entry is modified in one or more master data tables that are affected by the action. For example, changing a password may require only modifying an entry in the uniqueness table whereas creating a new account may require a new entry. An action may affect more than one ASD table. For example, adding a user will generally change the uniqueness table as well as a table that includes the rate plan for all subscribers to a phone service. If up-to-dateness of the affected table(s) is not critical, step 910 may be omitted. Alternatively, it should be appreciated that before creating a new entry such as a login, a check may be performed to determine whether the entry, e.g., login, is unique.

At step 920, an action is performed that changes data that is included in a universal ASD data table. At step 930, it is verified that the action was performed successfully. At step 940, the entry or entries in the master table(s) affected by the action is/are updated. Updating may include, but is not limited to, adding an entry, deleting an entry, or modifying an entry, e.g., changing the status to "confirmed" as in FIG. 8 above.

The process diagram shown in FIG. 9 describes the updating of a master universal ASD table. In a preferred embodiment, the universal ASD tables on other databases are updated periodically by transactional replication.

Figure 10:
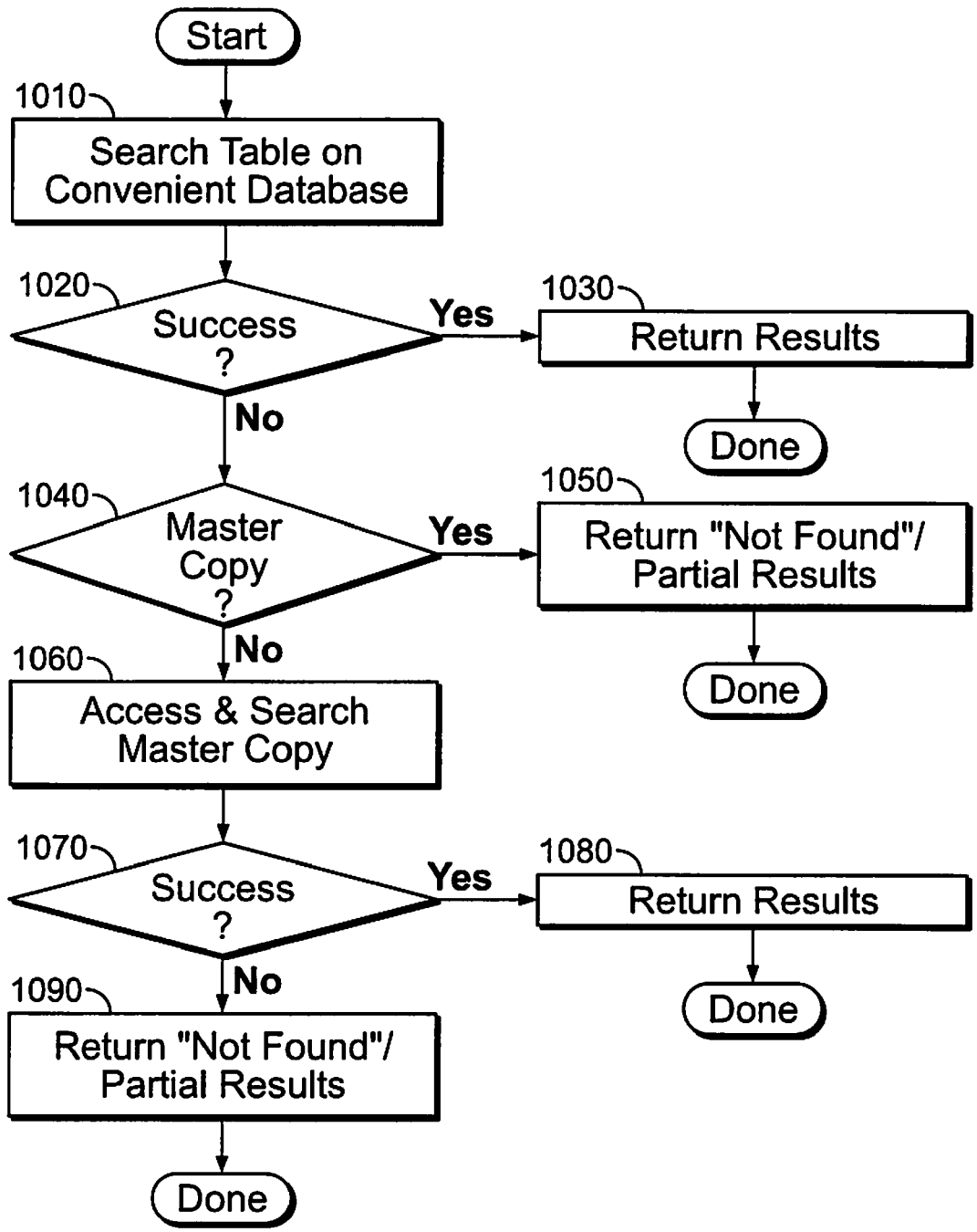
FIG. 10 is process flow diagram of searching using universal subscriber-specific data.

A flow chart for searching using an ASD table is shown in FIG. 10. It may be desired to find substantially all accounts having rate plan 1 or rate plan 2 using a table that includes the rate plan for all subscribers (the "rate plan table"). At step 1010, the rate plan table on any database, i.e., a convenient database, is searched for the selected criteria. The database may be any database, including one on which an open connection exists prior to step 1010.

At decision step 1020, it is determined whether a sufficient search has been performed. For example, when searching for a unique value such as a login name, if the unique value has been found, the result of decision step 1020 may be that a sufficient search has been performed. As another example, when searching for all accounts having rate plan 1 or rate plan 2, it may be determined whether a sufficient number of accounts has been found, or it may be determined that the date on the rate plan table is too old. If the date of the rate plan table is important to the search, preferably the date is checked before step 1010, and the step 1010 may be skipped if the date is unsatisfactory.

If the result of the decision in step 1020 is that the search was successful, the results are returned in step 1030. Usually, the results are the locations of accounts matching the selected criteria. For example, this criteria may be the service OID and the customer OID of all accounts having rate plan 1 or rate plan 2.

If the result of decision step 1020 is that the search was insufficient, process flow proceeds to decision step 1040 where it is determined whether the master copy was searched. If the master copy was used, then a "not found" or other error message, which may include partial results, is returned at a step 1050.

Alternatively, if a result of decision step 1040 is negative and the master copy was not used, process flow proceeds to step 1060 where the master copy is accessed and searched. At decision step 1070, it is determined whether the search has been successful. If the search was successful, then the requested information is returned at a step 1080. If the search was not successful, then the process proceeds from step 1070 to step 1090 where a "not found" or other error message, which may include partial results, is returned. For example, if the requested data is the first 100 accounts in a certain zip code, and only 80 accounts are found, the 80 accounts making up the partial results may be returned.

Returning to step 1070, if it is determined that the search has not been successful, instead of proceeding to step 1090, a global search may be performed of substantially all subscriber account databases until the search is either successful, or all databases have been searched. If the global search is successful, results may be returned. Alternatively, of the global search is not successful, a "not found" or other error message which may include partial results may be returned. The global search may also be performed if the master copy is not available, e.g., which the primary database is down. It should be understood that a global search may also be performed if the login is found but does not have a confirmed status.

In an alternate embodiment, for searches where the up-to-dateness of the data is important, a search may be preceded by a request to have the local table updated by having the data from the master copy pushed to the local data (replication on demand), or, alternatively, the search may be initiated on the master copy of the desired table.

As discussed above, embodiments of the invention make easily accessible a small and useful subset of subscriber data, through use of universal copies of subscriber-specific data. This is particularly useful for searching and locating accounts. In other embodiments, the present invention uses universal global data to greatly reduce the overhead of processing a transaction event by eliminating the need for coordinating two databases as described below.

Price information is an example of information that preferably is included in the global data. Preferably, the price information is stored as a table in the RDBMS and is accessible as a price object by the application 410 of FIG. 4. An example price list is shown in FIG. 11*a*. List 1102 generally includes an item number, which refers to a product such as a book title or a shirt model, and a unit price. List 1102 also includes a transactional discount when a dozen units are bought in one transaction. Another example price list is shown in FIG. 11*b*. Price list 1152 shown in FIG. 11*b* includes a price for a phone call based on length of the phone call, and shows that for the first ten minutes it costs 20 cents per minute, and for the next 40 minutes it costs 15 cents per minute, for the next 50 minutes 10 cents per minutes, and 5 cents per minutes thereafter. Price list 1152 may include other information such as tier cost such that ten minutes costs $2, fifty minutes cost $8, and one hundred minutes costs $13.

Figure 12:
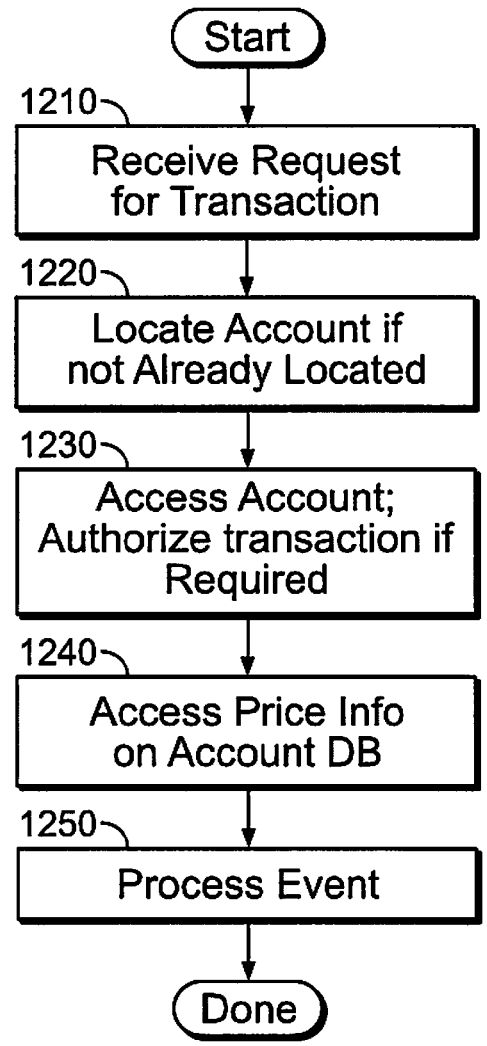
FIG. 12 is process flow diagram of processing a simple billing transaction.

An example process flow diagram of using global data to process an event is shown in FIG. 12. The example event is a simple billing event. At step 1210, a request to process the transaction is received. In general, this will be received at the connection manager from a client. It may be, for example, a request to purchase a shirt. At step 1220, the account is located if it has not already been located. If the account has not yet been located, it is preferably located using the uniqueness table and the login that is requesting the transaction. The account may have already been located, for example, if another item has already been purchased during the login session or if during the login process the account was located. At step 1230, the account is accessed using the location found in step 1220 or using a previously known location. In cases where the account was located using the most convenient uniqueness table, switching databases to the one on which the account is located may be required. Authorization of the transaction may be accomplished if desired. For example, the account may be checked to determine if it is in good standing by reviewing the subscriber account information.

At step 1240, the price information necessary to price the item(s) included in the transaction request is accessed by using the price table on the database that the account is located on. Because the price table and the account are on the same database, coordination of two bases is essentially not needed, and the two-phase commit procedure is also generally not needed. At step 1250, the simple billing event is processed per the transaction processing design. Typically, the transaction will be entered into the transaction history of the account. The account balance may be updated in a real-time system.

A general process flow diagram for processing an event that requires access to a subscriber account and global data is shown in FIG. 13. An example of an event that is processed may be the simple billing event shown in FIG. 12. At step 1310, a request for an event requiring access to a subscriber account and global data is received. At step 1320, the account is located if its location is not known. In a preferred embodiment, this is done using a universal subscriber specific data table such as the uniqueness table. At step 1330, the required global data is accessed by obtaining it from the universal global data on the same database as the account, i.e., by obtaining it from the local copy of the relevant global table(s). For example, a price table and a special promotions table may be accessed to obtain a price and any special discount that apply to the event. The local copy is the copy of the table that resides on the same database as the account. At step 1340, the event is processed per the protocol of the event processing system. Processing may include updating the subscriber account by updating the transaction history and the account balance.

Some events need not require access to an account but may require access to universal global data. For example, a mere inquiry about a price may not access an account but may require access to pricing information. In such a case, the "locate account" step 1320 of FIG. 13 may effectively be eliminated.

As discussed above, storage and replication of universal global data is performed similarly to the storage and replication of universal subscriber data. That is, a master copy of each table may be used to update copies on secondary databases. Updates to the universal global data may be made based on changes to the global data, or may be made periodically. The global data is generally changed by intervention of the managers of the systems, as for example when a price list is changed at the behest of marketers. When a change to the global data is made, the corresponding universal global data tables may be pushed, or replicated, to the secondary databases if desired. For example, the price table may be replicated whenever a price change is made.

Preferably, universal global data tables are updated periodically. Periodically updating universal global tables typically will be often enough for most businesses. For example, rather than applying during specific time periods, prices are often determined on a "when offered" basis. However, when it is desired for universal global data to be up-to-date at a specific time, the system may be configured so that the data is up-to-date, for example, by pushing the data to the secondary databases at a desired time, or by imposing other suitable constraints on the system. For instance, if desired, data may be replicated after a master price table is updated.

Embodiments of the invention generally provide transparent access to the multiple databases by an application. FIG. 14 is a process flow diagram of processing a data request that uses a global search of all databases and is received at the connection manager. The process begins at step 1410 in which a data request is received. The data request typically is a request for a data object. When possible, a data request will be handled by using universal ASD tables, as described above. However, when the data request may not be so handled, a global search of substantially all databases may be instituted. An example data request may be a request for all accounts with first name "John" and last name "Smith" with billing address in New York. Such information typically would not be included in a universal ASD table. The connection manager requests the data from the data managers, e.g., data managers 431-433 of FIG. 4, of all the databases. The object server on each data manager generates a database query, preferably a SQL inquiry, and sends it to its respective database at step 1420. The results from each database are received as a data stream at the connection manager at step 1430. The connection manager then interleaves the results as received from each database, and returns them at step 1440. In an alternate embodiment, the connection manager orders the results (e.g., sorts alphabetically or by opening date of account) before returning the results. Using such a method, configuration of the system is transparent to the requesting application. In another alternative embodiment, a specified subset of databases may be searched in lieu of searching all databases as indicated in step 1420.

The foregoing describes embodiments of the present invention, in which copies of one or more subsets, preferably of semi-static data, of global data are maintained at multiple databases. This effectively removes the need to access two databases to process a transaction, and essentially obviates the need for a two-stage commit. This greatly reduces the overhead of processing a transaction, and allows embodiments of the invention to be scalable to relatively large databases and relatively high demand applications. Embodiments of the invention may be practiced in a computer implemented batch system or a real time system. In general, the invention allows universal copies of aggregated subscriber-specific data to reduce response time and allow for relatively fast searching.

While the above is a complete description of preferred embodiments of the invention, various alternatives, modifications, and equivalents can be used. It should be evident that the invention is equally applicable by making appropriate modifications to the embodiments described above. By way of example, the flowcharts are exemplary embodiments but steps may be added, deleted, combined, and reordered without departing from the spirit and scope of the invention. For instance, in performing universal searches, it may be preferable to initiate the search on the relevant master table and omit steps 1010-1050 of FIG. 10.

The term subscriber includes substantially any customer, and is not limited to a subscriber of a service. Further, there may be one or more databases that do not include any subscriber account databases, but do include universal aggregated subscriber-specific data or universal global data, or both. Therefore, the above description should not be taken as limiting the scope of the invention that is defined by the metes and bounds of the appended claims along with their full scope of equivalents.

What is claimed is:

1. A method for processing an event in an event processing system comprising a plurality of databases, wherein the event processing system is associated with a plurality of accounts, and wherein each database in the plurality of databases is configured to store account data for a unique subset of accounts in the plurality of accounts, the method comprising:
   receiving, at a first server configured to manage a first database in the plurality of databases, an event associated with an account in the plurality of accounts,
      wherein processing the event requires access to account data for the account, and
      wherein the first database stores account data for a first subset of accounts;
   if the account is included in the first subset of accounts, retrieving the account data for the account from the first database;
   else if the account is not included in the first subset of accounts:
   accessing a data structure stored on the first database,
      wherein the data structure includes, for each account in the plurality of accounts, an identifier uniquely identifying said each account and location information indicating a database in the plurality of databases on which account data for said each account is stored;
   determining, based on the data structure, a second database in the plurality of databases that stores the account data for the account,
      wherein the second database stores account data for a second subset of accounts distinct from the first subset; and
   retrieving the account data for the account from the second database; and
   processing the event utilizing the account data for the account.

2. The method of claim 1, wherein the data structure is stored on each of the databases of the multi-database event processing system.

3. A method as in claim 1, wherein a two step commit is not utilized.

4. The method of claim 1 wherein processing the event further requires access to global information that is independent of the account, wherein a master copy of the global information is stored on a third database in the plurality of databases, wherein a replicated copy of the global information is stored on the first database, and wherein processing the event utilizing the account data for the account comprises:
   accessing the replicated copy of the global information stored on the first database; and
   processing the event utilizing the account data for the account and the replicated copy of the global information, such that the event is processed without accessing the master copy of the global information stored on the third database.

5. A method as in claim 1, wherein the event processing system is an accounting system.

6. A machine-readable medium for a computer system, the machine-readable medium having stored thereon a series of instructions which, when executed by a processing component, cause the processing component to process an event in an event processing system comprising a plurality of databases, wherein the event processing system is associated with a plurality of accounts, and wherein each database in the plurality of databases is configured to store account data for a unique subset of accounts in the plurality of accounts, by:
   receiving, at a first server configured to manage a first database in the plurality of databases, an event associated with an account in the plurality of accounts,
      wherein processing the event requires access to account data for the account, and
      wherein the first database stores account data for a first subset of accounts;
   if the account is included in the first subset of accounts, retrieving the account data for the account from the first database;
   else if the account is not included in the first subset of accounts:
   accessing a data structure stored on the first database,
      wherein the data structure includes, for each account in the plurality of accounts, an identifier uniquely identifying said each account and location information indicating a database in the plurality of databases on which account data for said each account is stored;
   determining, based on the data structure, a second database in the plurality of databases that stores the account data for the account,
      wherein the second database stores account data for a second subset of accounts distinct from the first subset; and retrieving the account data for the account from the second database; and processing the event utilizing the account data for the account.

7. The machine-readable medium of claim 6, wherein the machine-readable medium is one of a CD-ROM, floppy disk, tape, flash memory, system memory, hard drive, or data signal embodied in a carrier wave.

8. The machine-readable medium of claim 6 further comprising:

replicating the data structure on the first database to another database of the multi-database event processing system.

9. The machine-readable medium of claim 6 wherein processing the event further requires access to global information that is independent of the account, wherein a master copy of the global information is stored on a third database in the plurality of databases, wherein a replicated copy of the global information is stored on the first database, and wherein processing the event utilizing the account data for the account comprises:

accessing the replicated copy of the global information stored on the first database; and processing the event utilizing the account data for the account and the replicated copy of the global information, such that the event is processed without accessing the master copy of the global information stored on the third database.

10. The machine-readable medium of claim 9, wherein the machine-readable medium is one of a CD-ROM, floppy disk, tape, flash memory, system memory, hard drive, or data signal embodied in a carrier wave.

* * * * *

UNITED STATES PATENT AND TRADEMARK OFFICE
CERTIFICATE OF CORRECTION

PATENT NO. : 7,406,471 B1 Page 1 of 1
APPLICATION NO. : 09/967493
DATED : July 29, 2008
INVENTOR(S) : Shankar et al.

It is certified that error appears in the above-identified patent and that said Letters Patent is hereby corrected as shown below:

In column 8, line 37, after "copy" delete ")," and insert -- , --.

Signed and Sealed this

Twenty-second Day of December, 2009

David J. Kappos
*Director of the United States Patent and Trademark Office*